(12) United States Patent
Hucker et al.

(10) Patent No.: US 11,085,219 B2
(45) Date of Patent: Aug. 10, 2021

(54) DRIVE FOR A DOOR LEAF OR WINDOW LEAF

(71) Applicant: Geze GmbH, Leonberg (DE)

(72) Inventors: Matthias Hucker, Marxzell (DE); Simon Burghard, Leinfelden-Echterdingen (DE); Dirk Huber, Schwaikheim (DE); Thomas Schüler, Stuttgart (DE); Jörg Evertz, Birmensdorf (CH); Simon Thomas Hasenfratz, Zürich (CH); Remo Sommer, Zürich (CH)

(73) Assignee: Geze GmbH, Leonberg (DE)

( * ) Notice: Subject to any disclaimer, the term of this patent is extended or adjusted under 35 U.S.C. 154(b) by 279 days.

(21) Appl. No.: 15/890,076

(22) Filed: Feb. 6, 2018

(65) Prior Publication Data

US 2018/0313130 A1   Nov. 1, 2018

(30) Foreign Application Priority Data

Feb. 8, 2017   (DE) .......................... 102017201958.1

(51) Int. Cl.
*E05F 3/22* (2006.01)
*E05F 3/00* (2006.01)
(Continued)

(52) U.S. Cl.
CPC .................. *E05F 3/22* (2013.01); *E05F 1/10* (2013.01); *E05F 3/00* (2013.01); *E05F 3/224* (2013.01); *E05F 15/60* (2015.01); *E05F 15/611* (2015.01); *H02P 3/12* (2013.01); *H02P 3/16* (2013.01); *H02P 7/29* (2013.01); *E05Y 2400/302* (2013.01); *E05Y 2400/32* (2013.01); *E05Y 2400/36* (2013.01); *E05Y 2400/452* (2013.01); *E05Y 2400/454* (2013.01);
(Continued)

(58) Field of Classification Search
CPC ....... E05F 1/10; E05F 3/00; E05F 3/22; E05F 3/224
See application file for complete search history.

(56) References Cited

U.S. PATENT DOCUMENTS 4,727,679 A  *  3/1988  Kornbrekke ............ E05F 15/63
49/138
4,973,894 A  *  11/1990  Johansson ............. E05F 1/1016
318/266

(Continued)

FOREIGN PATENT DOCUMENTS

WO    2010127379 A1    11/2010
WO    2012152448 A1    11/2012
WO    2014152907 A1    9/2014

*Primary Examiner* — Gregory J Strimbu
(74) *Attorney, Agent, or Firm* — Steven M. Shape; Dennemeyer & Associates, LLC

(57) ABSTRACT

A drive for a leaf of a door, window, or the like, including a mechanical energy store (16) configured to store energy during an opening movement of the leaf and expend energy during a closing movement of the leaf, an electric motor (18) operatively connected to the leaf via a motor shaft (20), the electric motor (18) operated as a generator to dampen the opening movement and the closing movement. The electric motor including a control unit configured to control the electric motor, wherein a drive behavior of the control unit is repeatedly and variably adaptable to a current need of a user.

11 Claims, 1 Drawing Sheet

(51) Int. Cl.
*E05F 15/611* (2015.01)
*E05F 1/10* (2006.01)
*E05F 15/60* (2015.01)
*H02P 3/12* (2006.01)
*H02P 3/16* (2006.01)
*H02P 7/29* (2016.01)

(52) U.S. Cl.
CPC ... *E05Y 2800/113* (2013.01); *E05Y 2900/132* (2013.01); *E05Y 2900/148* (2013.01)

(56) References Cited

U.S. PATENT DOCUMENTS

| | | | | |
|---|---|---|---|---|
| 5,243,735 | A * | 9/1993 | O'Brien, II | E05F 3/104 |
| | | | | 16/64 |
| 5,687,507 | A * | 11/1997 | Beran | E05F 15/70 |
| | | | | 49/340 |
| 6,595,429 | B1 * | 7/2003 | Carlson | F24F 9/00 |
| | | | | 236/44 R |
| 9,501,047 | B2 * | 11/2016 | Salutzki | E05F 3/224 |
| 9,939,054 | B2 * | 4/2018 | Stephenson | F16H 25/2228 |
| 10,077,591 | B2 * | 9/2018 | Hass | E05F 15/70 |
| 10,273,736 | B2 * | 4/2019 | Hucker | E05F 5/00 |
| 10,316,568 | B2 * | 6/2019 | Langenberg | E05F 15/611 |
| 2018/0010375 | A1 * | 1/2018 | Sauter | E05F 1/105 |
| 2018/0371818 | A1 * | 12/2018 | Ladha | E05F 3/22 |
| 2019/0338578 | A1 * | 11/2019 | Soderqvist | H02P 3/08 |

* cited by examiner

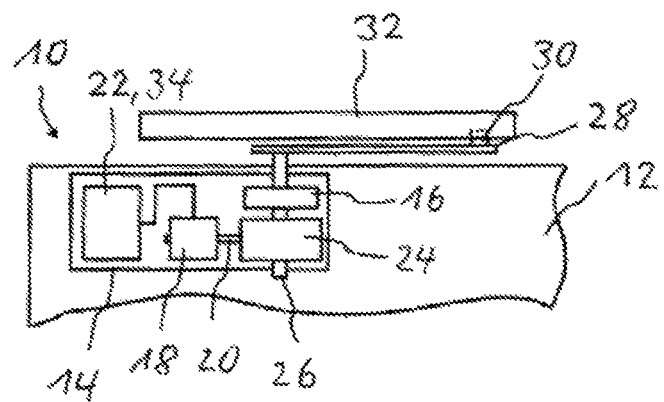

DRIVE FOR A DOOR LEAF OR WINDOW LEAF

CROSS-REFERENCE TO RELATED APPLICATIONS

This application claims priority to German application 102017201958.1, filed Feb. 8, 2017, which is hereby incorporated by reference in its entirety.

The invention relates to a drive for a leaf of a door, window, or the like, having at least one mechanical energy store, which is charged by an opening movement of the leaf and discharged with a closing movement of the leaf.

Drives or door closers for movable door leafs with a mechanical energy store are generally known. When the door leaf is opened manually, the mechanical energy store is charged with potential energy, which is used to close the door again upon release. The mechanical energy store can comprise, for example, a spring, which is tensioned by the manual opening of the door leaf and relaxes again with the closure of the door leaf.

Hydraulic door closers are also known, the closing behaviour of which, for example the closing time, the closing delay, the end stop position or the opening damping, are adjustable. In the case of such hydraulic door closers however, the relevant properties are defined statically, in other words permanently. They are set once by the installer during the initial installation and can then no longer be changed.

DE 10 2015 200 284 also discloses an autonomous, generator-driven damped door closer with at least one electric motor that can be operated as a generator, the motor shaft of which is operatively connected to the leaf and the motor terminals of which can be short-circuited via control and/or regulator electronics unit to damp the movements of the leaf. This door closer also further comprises a mechanical energy store, which is charged with potential energy upon manually opening the door leaf. When the leaf is being closed by the stored potential energy, the closing movement of the leaf may be damped using the electric motor operated as a generator. This allows such properties as, in particular, the damping behaviour of the door closer to be changed dynamically as a function of current conditions, such as the current direction of motion, the current speed and/or the current opening angle of the door leaf. But even with such a generator-driven damped door closer, as in the case of the hydraulic door closers, the drive behaviour can still not be individually adapted to the current needs of a particular user of the door closer.

The object of the invention is to specify a drive of the above-mentioned type, the drive behaviour of which can be variably adjusted repeatedly to suit the current needs of the particular user, even after installation is completed.

The object is achieved in accordance with the invention by a drive having the features of claim 1. Preferred embodiments of the drive according to the invention result from the dependent claims, the present description and the drawing.

The drive according to the invention for a leaf of a door, window, or the like comprises at least one mechanical energy store, which is charged by an opening movement of the leaf and discharged by a closing movement of the leaf, at least one electric motor, which is operatively connected to the leaf via at least one motor shaft and can be operated as a generator in order to dampen the leaf movements, and a control and/or regulator electronics unit for controlling the electric motor. The control and/or regulator electronics unit comprises means via which the drive behaviour can be variably specified repeatedly by a respective user and/or via which the drive behaviour can be variably adjusted repeatedly in accordance with the behaviour of a respective user.

As a result of this design, the drive behaviour of the drive or door closer can be variably adjusted repeatedly to suit the current needs of the particular user even after installation is completed. Users of the drive or door closer include, in addition to persons such as a caretaker responsible for the door concerned, all passers-by who open the door and pass through it, and after which the door closer should close the door again. In principle, however, the drive according to the invention can also be provided for windows or the like.

In accordance with a preferred practical embodiment of the drive according to the invention, using the means for variably specifying and/or adjusting the drive behaviour, the damping behaviour of the generator-driven damping of the leaf movement can be individually specified or adjusted. To provide the corresponding generator-driven damping of the movement of the leaf, the electric motor which can be operated as a generator can be appropriately controlled via the control and/or regulator electronics unit.

It is also particularly advantageous if the drive behaviour can be specified or adjusted individually by a respective user via the means for the variable specification and/or adjustment, depending on the type of manual activation of the leaf.

In this case, in accordance with a preferred practical embodiment of the drive according to the invention, the means for the variable specification and/or adjustment of the drive behaviour is designed such that, after a specifiable normal opening of the leaf by a respective user, in particular with a specifiable normal speed, the subsequent closing movement of the leaf is damped in a generator-driven manner according to a setting made during initial installation.

For example, a damping curve for the normal closing can be adjusted by an installer closing the leaf for the first time manually and using its closing curve, specifying to the drive how it should damp the leaf in a generator-driven manner in future. In this case, the closing curve can be specified by the manner in which the installer closes the leaf for the first time.

According to a further advantageous practical embodiment of the drive according to the invention, the means for the variable specification and/or adjustment of the drive behaviour is designed such that, in the event of a faster actuation of the leaf by a respective user in comparison to a specifiable normal operation of the leaf, the opening movement of the leaf is damped using a second variable generator-driven damping in addition to a first constant generator-driven opening damping, in such a way that following its release the leaf comes to a halt upon reaching the maximum opening angle.

An "intelligent opening damping" of the movable leaf, for example the door leaf, therefore takes place, in which after release the leaf is constantly damped in such a way that regardless of the kinetic energy upon release, it does not strike against the open position. This enables the means for variable specification and/or adjustment of the drive behaviour of the control and/or regulator electronics unit to control, for example, by means of pulse-width modulation, a short circuit of the terminals of the electric motor that can be operated as a generator, and thus the variable second damping of the opening movement of the movable leaf, in such a way that given sufficient kinetic energy, the leaf stops in its maximum open position without striking it. Depending on the kinetic energy in the leaf, the second variable damping comes into play sooner or later, in order to adapt the braking curve optimally to the current kinetic energy in the leaf and to the ambient conditions, such as temperature and/or friction conditions and/or wind conditions, etc. The second damping can be regulated, for example, via a damping characteristic curve in such a way that the leaf comes to rest exactly in the open position. At least one sensor can be provided for the detection of at least one physical variable which represents the opening movement of the door leaf. The output signals of such a sensor can be fed to the means for variable specification and/or adjustment of the drive behaviour of the control and/or regulator electronics unit.

According to a further advantageous practical embodiment of the drive according to the invention the means for the variable specification and/or adjustment of the drive behaviour is designed such that, if the particular user of the leaf activates the leaf more slowly, more irregularly and/or in a more jittery manner compared to a specifiable normal activation of the leaf, before being closed the leaf is first held open for a specifiable time and then closed again more slowly than a specifiable normal speed, by means of a corresponding generator-driven damping of the closing movement of the leaf.

It can thus be ensured, for example, that disabled people, elderly people or children can pass through a door more easily. Using the means for variable specification and/or adjustment of the drive behaviour of the control and/or regulator electronics unit, the speed profile during opening of the leaf can be detected and the damping behaviour of the drive during closing of the leaf can be adapted accordingly.

It is also advantageous, in particular, if using the means for variable specification and/or adjustment, the drive behaviour can be individually specified or adjusted depending on whether or not a respective user intends to pass through the door concerned with bulky objects, or using a wheelchair or the like.

If a passer-by, for example, wants to carry luggage or crates of beverages or other bulky items through the door concerned, or wants to push a disabled person in a wheelchair through the door, the door can thus be kept open correspondingly longer and can then close with a specifiable normal speed. A passer-by can interrupt the normal closing process of the leaf, for example, by holding the leaf in place for a specifiable time. The means for variable specification and/or adjustment of the drive behaviour of the control and/or regulator electronics unit detects this on the basis of corresponding signalling and can then switch over to a maximum damping. As soon as the passer-by has, for example, carried his/her luggage through the door or pushed the wheelchair through the door, he/she can lightly tap the door leaf in the opening direction, which is again detected by the means for variable specification and/or adjustment of the drive behaviour, whereupon the closing operation can be continued with normal damping.

A further advantageous practical embodiment of the drive according to the invention is characterized in that using the means for the variable specification and/or adjustment of the drive behaviour, the respective opening time, during which the leaf is held open, is adjustable depending on the current frequency of foot traffic of the door concerned, and/or depending on the time of day.

If the door is being used more often in a short period, it can therefore remain open for relatively longer periods of time. If, on the other hand, the frequency of foot traffic drops again, the door can close again normally according to a specifiable closing behaviour. In addition, a door can be held open for longer at certain times, such as during the day, and closed relatively quickly at other times, such as at night.

In accordance with another preferred practical embodiment the drive comprises a position fixing device, which can be activated by a respective user via the means for the variable specification and/or adjustment of the drive behaviour at an opening angle, which is in particular freely selectable. In this case the leaf can in particular be fixed in position against the force of the mechanical energy store by the fact that the electric motor can have external electrical energy applied thereto via the control and/or regulator electronics unit and/or that a braking device can be controlled for activating a motor shaft of the electric motor.

To activate the fixing, a door handle, for example, can be equipped with a nut contact switch. When a respective user opens the door leaf up to the desired fixing angle and activates the door handle here, the means for variable specification and/or adjustment of the drive behaviour detects the corresponding actuation of the door handle outside of the closed position, whereupon the fixing is activated. The means for the variable specification and/or adjustment of the drive behaviour is preferably also designed in such a way that the stationary leaf can be released from the fixed position again by a respective user.

It is also particularly advantageous if the means for the variable specification and/or adjustment of the drive behaviour comprises at least one device for the manual, voice-controlled and/or similar input of the desired drive behaviour by a respective user, which can also be transmitted via wireless communication.

Thus, for example, to release a door leaf a respective user can either activate the door handle again or use a password, such as "release", or activate the fixed position by means of wireless or remote control, or simply close the door by hand.

If the drive comprises a position fixing device, then a door leaf can be released to a limited extent as if by means of a chain, and prevented from being opened further. For the activation of the "chain" before opening the door, the user can operate the door handle, for example, according to a certain sequence or use a password and then use the codeword "chain" within a specifiable time, whereupon the door leaf activates the position fixing device via the means for the variable specification and/or adjustment of the drive behaviour of the control and/or regulator electronics unit with the door only partly open, to block any further opening of the door leaf. To enable the further opening of the door leaf, the user can, for example, operate the door handle before the continued opening of the door leaf with a different or the same sequence as used for enabling the fixing, or else use the password and then within a definable time use the codeword "open", for example. The position fixing device is then released again, so that a further opening of the door leaf is enabled. By means of an appropriate activation of the position fixing device using the means for variable specification and/or adjustment of the drive behaviour, the position fixing device can therefore be used in the manner of a chain. A particular user can thus, for example, after a knock at the door, initially only open the door slightly to see who is at the door, before deciding whether or not to open the door fully to the person concerned.

Preferably, the drive comprises means for sensing the current position, the current speed and/or the current acceleration of the door leaf. In addition, the means for the variable specification and/or adjustment of the drive behaviour is preferably designed in such a way that the closing and/or opening movement of the leaf can be damped in a generator-driven manner depending on the current detected leaf position, the current detected leaf speed and/or the current detected leaf acceleration.

According to an advantageous practical embodiment of the drive according to the invention, the control and/or regulator electronics unit comprises an electrical damping circuit to which the motor terminals of the electric motor can be connected. The electrical damping circuit comprises at least one switching element, via which the motor terminals of the electric motor can be short circuited.

In this case, the control and/or regulator electronics unit can in particular comprise a control and/or regulator unit, via which the switching element for damping the movements of the leaf is controllable by pulse-width modulation.

For an at least partially autonomous operation, the drive can also comprise an electrical storage unit, which can be charged via at least one electric motor that can be operated as a generator and which can be supplied with electrical energy via the control and/or regulator electronics unit.

BRIEF DESCRIPTION OF THE DRAWINGS

FIG. 1. is a diagram of an embodiment of the Drive for a door leaf or window leaf disclosed herein.

The invention is explained in more detail below on the basis of an exemplary embodiment with reference to the drawing. The single FIGURE of the drawing shows a schematic representation of an exemplary embodiment of a drive 10 according to the invention for a leaf 12 of a door. In principle, however, the drive 10 can also be provided for the leaf of a window or the like.

The drive 10 comprises a housing 14, a mechanical energy store 16, which is charged by an opening movement of the leaf 12 and discharged by a closing movement of the leaf 12, at least one electric motor 18, which is operatively connected to the leaf 12 via at least one motor shaft 20 and can be operated as a generator in order to dampen the leaf movements, and a control and/or regulator electronics unit 22 for controlling the electric motor 18.

The drive 10 in the present case is fastened via its housing 14 to the leaf 12, for example. The motor shaft 20 of the electric motor 18 is coupled via a transmission 24 to an output shaft 26 of the drive 10, to which output shaft in the present case, for example, a sliding arm 28 is connected in a rotationally fixed manner, which at its free end is fitted with a sliding block 30 that is guided in a bezel-mounted sliding rail 32.

The control and/or regulator electronics unit 22 comprises means 34 via which the drive behaviour can be variably specified repeatedly by a respective user and/or via which the drive behaviour can be variably adjusted repeatedly in accordance with the behaviour of a respective user.

Via the means 34 for the variable specification and/or adjustment of the drive behaviour, in particular the damping behaviour of the generator-driven damping of the leaf movements can be individually specified or adjusted.

Alternatively or additionally, the drive behaviour can be individually specified or adjusted by a respective user via the means 34 for the variable specification and/or adjustment, depending on the type of manual activation of the leaf 12.

In this case the means 34 for the variable specification and/or adjustment of the drive behaviour can be designed such that, after a specifiable normal opening of the leaf 12 by a respective user, in particular with a specifiable normal speed, the subsequent closing movement of the leaf 12 is damped in a generator-driven manner according to a setting made during initial installation.

The means 34 for the variable specification and/or adaptation of the drive behaviour can also be designed such that in the event of a faster actuation of the leaf 12 by a respective user in comparison to a specifiable normal operation of the leaf 12, in addition to a constant first generator-driven opening damping, the opening movement of the leaf 12 is damped using a second variable generator-driven damping, such that after being released the leaf 12 comes to a stop upon reaching the maximum opening angle.

Alternatively or additionally the means 34 for the variable specification and/or adjustment of the drive behaviour is designed such that, if the particular user of the leaf 12 activates the leaf 12 more slowly, more irregularly and/or in a more jittery manner compared to a specifiable normal activation of the leaf 12, before being closed the leaf is first held open for a specifiable time and then closed again more slowly than a specifiable normal speed by means of a corresponding generator-driven damping of the closing movement of the leaf 12.

Via the means 34 to the variable specification and/or adjustment the driving behaviour can, in particular, be individually specified or adapted depending on whether or not a particular user wants to pass through the door concerned with bulky objects, a wheelchair or the like.

In addition, using the means 34 for the variable specification and/or adjustment of the drive behaviour, the respective opening time, during which the leaf 12 is held open, is adjustable depending on the current frequency of foot traffic through the door concerned and/or depending on the time of day.

Alternatively or additionally, the drive 10 comprises a position fixing device, which can be activated by a respective user via the means 34 for the variable specification and/or adjustment of the drive behaviour at an opening angle, in particular one which is freely selectable. In this case the leaf 12 can in particular be fixed in position against the force of the mechanical energy store 16, by the fact that the electric motor 18 can have external electrical energy applied thereto via the control and/or regulator electronics unit 22 and/or that a braking device can be controlled for activating a motor shaft 20 of the electric motor 18.

The means 34 for the variable specification and/or adjustment of the drive behaviour can preferably also be designed in such a way that the stationary leaf 12 can also be released from the fixed position again by a respective user.

The means 34 for the variable specification and/or adjustment of the drive behaviour can also comprise in particular at least one device for the manual, voice-controlled and/or similar input of the particular desired drive behaviour by a respective user, which can also be transmitted via wireless communication.

The drive 10 may, in particular, also comprise means for the detection of the current position, the current speed and/or the current acceleration of the leaf 12. In particular, the means 34 for the variable specification and/or adjustment of the drive behaviour can be preferably designed in such a way that the closing and/or opening movement of the leaf can be damped in a generator-driven manner depending on the current detected leaf position, the current detected leaf speed and/or the current detected leaf acceleration.

The control and/or regulator electronics unit 22, or the means 34 thereof for the variable specification and/or adjustment of the drive behaviour, may in particular comprise an electrical damping circuit to which the motor terminals of the electric motor 18 can be connected. Such an electrical damping circuit can comprise at least one switching element, via which the motor terminals of the electric motor 18 can be short circuited. In this case, the control and/or regulator electronics unit 22 can comprise in particular a control and/or regulator unit, via which the switching element can be controlled by pulse-width modulation for damping the leaf movements.

The drive 10, or the means 34 thereof for the variable specification and/or adjustment of the drive behaviour, can be equipped with electrical inputs, to which additional input means can be connected, such as a door handle with contact, a switch, a button provided near the door, and/or similar components can be connected. As already mentioned, the drive 10 can also be equipped with a wireless communication, via which additional input means such as a door handle with a radio transmitter or infrared, a remote control, a switch with radio transmitter or infrared and/or the like communicate.

A corresponding drive 10 or door closer can be operated by a respective passer-by, for example, by executing defined movement operations on the door leaf that differ from a normal passage, or telling the drive or door closer with integrated damping device how it should damp the leaf, or operating the drive 10 or door closer with integrated damping device via switches, buttons and/or the like, or operating the drive 10 or door closer with integrated damping device via a wireless connection or the like. The operating means mentioned are freely interchangeable or can be freely combined.

REFERENCE SYMBOL LIST

10 Drive
12 Leaf
14 Housing
16 Mechanical energy store
18 Electric motor
20 Motor shaft
22 Control and/or regulator electronics unit
24 Transmission
26 Output shaft
28 Sliding arm
30 Sliding block
32 Sliding rail
34 Means for the variable specification and/or adjustment of the drive behaviour

The invention claimed is:

1. A drive (10) for a door leaf (12) of a door, comprising:
a mechanical energy store (16) configured to store a first amount of energy during an opening movement of the leaf (12) and expend a second amount of energy during a closing movement of the leaf (12);
an electric motor (18) operatively connected to the leaf (12) via a motor shaft (20), the electric motor (18) operated as a generator to dampen the opening movement of the leaf and the closing movement of the leaf; and
a control unit (22) operatively connected to the electric motor (18), the control unit (22) configured to control the electric motor (18), wherein a drive behavior of the control unit (22) is adjustable based on manual activation of the leaf by a user, and, when a speed of the manual activation of the leaf during the opening movement of the leaf is greater than a speed of a predetermined activation of the leaf (12) during the opening movement of the leaf, the control unit is configured to dampen the opening movement of the leaf (12) using a first constant generator-driven damping and a second variable generator-driven damping such that, after the leaf is released by the user, the opening movement of leaf (12) continues until the leaf reaches a maximum opening angle,
wherein the control unit is configured to hold the leaf open an adjustable amount of time, wherein the adjustable amount of time is determined by a time of day.

2. The drive according to claim 1 wherein the control unit is configured to damp the opening movement of the leaf and the closing movement of the leaf individually.

3. The drive according to claim 1 wherein, after a specifiable opening movement of the leaf (12) by the user, the control unit is configured to dampen the closing movement of the leaf (12) according to a predetermined setting.

4. The drive according to claim 1 wherein the control unit is configured to adjust the drive behavior based on the user.

5. The drive according to claim 1 further comprising a position fixing device activated by the user for setting an opening angle of the leaf.

6. The drive according to claim 5 wherein the leaf (12) is positionable in a fixed position against a force of the mechanical energy store (16) by the electric motor (18).

7. The drive according to claim 5 wherein the control unit is configured to release the leaf (12) from a fixed position.

8. The drive according to claim 1 wherein the control unit (22) comprises an electrical damping circuit to which motor terminals of the electric motor (18) are connected, and the electrical damping circuit comprises a switching element via which the motor terminals of the electric motor (18) can be short-circuited.

9. The drive according to claim 8 wherein the switching element is controlled by pulse-width modulation to cause the damping of the opening movement of the leaf and the closing movement of the leaf.

10. The drive according to claim 1 wherein the control unit is configured to detect at least one of a current position, a current speed, or a current acceleration of the leaf (12) such that at least one of the opening movement of the leaf and the closing movement of the leaf is damped depending on the at least one of the current position, the current speed, or the current acceleration of the leaf.

11. A drive (10) for a door leaf (12) of a door, comprising:
a mechanical energy store (16) configured to store a first amount of energy during an opening movement of the leaf (12) and expend a second amount of energy during a closing movement of the leaf (12);
an electric motor (18) operatively connected to the leaf (12) via a motor shaft (20), the electric motor (18) operated as a generator to dampen the opening movement of the leaf and the closing movement of the leaf; and
a control unit (22) operatively connected to the electric motor (18), the control unit (22) configured to control the electric motor (18), wherein a drive behavior of the control unit (22) is adjustable based on manual activation of the leaf by a user, and, when a speed of the manual activation of the leaf during the opening movement of the leaf is greater than a speed of a predetermined activation of the leaf (12) during the opening movement of the leaf, the control unit is configured to dampen the opening movement of the leaf (12) using a first constant generator-driven damping and a second variable generator-driven damping such that after the leaf is released by the user, the opening movement of the leaf (12) continues until the leaf reaches a maximum opening angle,
wherein the control unit comprises a device for determining the drive behavior of the control unit based on at least one of manually controlled or voice-controlled input from the user.

* * * * *